United States Patent [19]

Patterson et al.

[11] Patent Number: 5,349,717
[45] Date of Patent: Sep. 27, 1994

[54] WET INTEGRAL WINDSHIELD WIPER ARM

[75] Inventors: Douglas D. Patterson, Centerville; Harry C. Buchanan, Jr., Spring Valley; Michael J. McClain, Dayton, all of Ohio

[73] Assignee: ITT Automotive Electrical Systems, Inc., Auburn Hills, Mich.

[21] Appl. No.: 960,624

[22] Filed: Oct. 14, 1992

[51] Int. Cl.$^5$ ............................ B60S 1/34; B60S 1/46; B60S 1/48
[52] U.S. Cl. ................... 15/250.04; 15/250.34; 15/250.35; 239/284.1; 239/587.6; 74/42; 74/519
[58] Field of Search ........... 15/250.04, 250.03, 250.02, 15/250.01, 250.35, 250.34, 250.30; 239/284.1, 284.2, 587.5, 587.6; 74/42, 519, 587; 134/180, 181

[56] References Cited

U.S. PATENT DOCUMENTS

| | | | |
|---|---|---|---|
| 2,168,202 | 8/1939 | Grantham | 15/250.04 |
| 2,196,551 | 4/1940 | Fischer et al. | 15/250.04 |
| 2,348,502 | 5/1944 | Smulski | 15/250.04 |
| 2,351,699 | 6/1944 | Parry et al. | 15/250.04 |
| 3,147,505 | 9/1964 | Capasso | 15/250.04 |
| 3,574,883 | 4/1971 | Brittain et al. | 15/250.02 |
| 3,670,354 | 6/1972 | Weber | 15/250.04 |
| 3,887,956 | 6/1975 | Wind | 15/250.04 |
| 4,245,523 | 1/1981 | Wherry | 74/519 |
| 4,439,887 | 4/1984 | Fischer et al. | 15/250.04 |
| 4,893,865 | 1/1990 | McClain et al. | 296/192 |

FOREIGN PATENT DOCUMENTS 2646-801-A of 1989 France.

OTHER PUBLICATIONS

Plastics Technology, Jun. 1989, Michael Fallon, pp. 70–75.
Modern Plastics, Feb. 1990, Robert V. Wilder, pp. 64–68.
ANTEC '91 (Proceedings), 1991, S. Shah and D. Hlavaty, pp. 1479–1493.
Visual Aids from 1989 Presentation by S. Shah, 23 pages.

Primary Examiner—Timothy F. Simone
Assistant Examiner—Gary K. Graham
Attorney, Agent, or Firm—Robert P. Seitter; J. Gordon Lewis

[57] ABSTRACT

An integral windshield wiper arm having a pivot, a crank, and a blade mount communicates fluid from a reservoir beneath a cowl to a windshield wiper blade above the cowl. The pivot has a sealed cavity running its length. The cavity in each of the crank and the blade mount fluidly connect with the cavity in the pivot.

2 Claims, 2 Drawing Sheets

WET INTEGRAL WINDSHIELD WIPER ARM

TECHNICAL FIELD

This invention pertains to windshield wiper arms. More particularly, this invention pertains to wet windshield wiper arms which communicate fluid to the windshield wiper blades.

BACKGROUND OF THE INVENTION

Wet wiper arms, that is, wiper arms communicating windshield washer fluid to the windshield, are well-known in the art of windshield wipers. However, these wet wiper arms are of multiple piece construction and have been used with single sheet cowls.

Wiper arms in general are typically mounted in a cowl bridging a gap between a back wall of the engine compartment and a lower edge of the windshield. Fluid for wet wiper arms must be transported from a reservoir below the cowl to the blade above the cowl. This needs to be done without interfering with the windshield wiper arm as the blade is moved across the windshield. The arm is commonly used as a conduit for the fluid because the arm passes through the cowl and moves with the blade.

The windshield wiper arm has a bellcrank configuration, comprising a pivot, a crank and a blade mount. The pivot is commonly elongated in the form of a shaft or a sleeve. The crank projects from one end of the pivot. The blade mount projects from the opposite end of the pivot and is offset from the crank.

The pivot is rotatably mounted to the cowl. The crank is connected to a drive mechanism on a bottom side of the cowl. The blade mount is connected to an arm extension above the cowl, the arm extension being in turn connected to the blade.

With single sheet cowls, the pivot passes through, and is rotatably supported by, a cylindrical sleeve fixed to the cowl. This configuration requires the arm be of multiple piece construction. One of the crank and the blade mount must be separable from the pivot sleeve to facilitate the pivot passing through the cowl sleeve. An advantage of this configuration with regard to communicating fluid is that it easily accommodates the provision of a center cavity in the pivot which can be used to fluidly connect the reservoir under the cowl with fluid outlets above the cowl. Typically, fluid has been supplied directly to the pivot beneath the cowl, from where it travels to the blade mount above the cowl.

Integral arms are generally employed with dual flange or dual sheet cowls as is shown in U.S. Pat. No. 4,893,865, to McClain et al., issued Jan. 16, 1990, and assigned to the assignee of the present invention. The dual sheets of the cowl sandwich the pivot of the arm. A bolt passes through first one sheet, then the pivot, and then the second sheet, rotatably fixing the arm to the cowl.

Because the pivot does not have to pass through a sleeve, the dual sheet cowl is able to accommodate integral wiper arms integrating the crank, the blade mount, and the pivot into a single piece. The crank projects below the cowl and the blade mount projects above the cowl when the arm is in the vehicle. However, the center of the pivot is unavailable for communicating fluid as it is occupied by the bolt about which the arm pivots.

SUMMARY OF THE INVENTION

The present invention provides an improved integral arm for use with dual sheet cowls. The arm is hollow, allowing communication of windshield washer fluid through the arm, and providing an increased strength to weight ratio. The hollow structure is provided by three interconnected cavities in the crank, the pivot, and the blade mount of the arm.

The arm communicates windshield washer fluid from the crank to the blade mount through the pivot. The pivot has a cylindrical, generally double walled, sleeve configuration. An inner wall and an outer wall of the pivot define a cavity therebetween. The inner wall provides a center aperture in the pivot accommodating a bolt or a similar pivot pin about which the arm can rotate. The inner wall also serves as a bearing surface for the arm against the bolt. The outer wall has the crank and the blade mount fixed to it. Both the crank and the blade mount have interior cavities connecting to the pivot cavity. The cavity between the walls of the pivot accommodates fluid communication along the length of the pivot. Nozzles can be integrated into the crank and the blade mount at appropriate locations to facilitate fluid flow from the reservoir to the windshield.

This design accommodates the forming of the entire wiper arm—the crank, the pivot, the blade mount and the nozzles—by gas injection molding. The use of gas injection molding is facilitated by using the nozzles as gates for the entry of gas as well as plastic into the mold. The use of nozzles as gates eliminates any need for machining of openings in the wiper arm and eliminates the need to patch any holes in the wiper arm at other locations where gas would have been injected or vented.

The hollow configuration of the arm also improves its strength to weight ratio. Moving material from the center of the arm to the outside of the arm increases the bending strength of the arm.

It is an object of this invention to provide an improved integral wiper arm having a pivot with means of accommodating arm rotation, a crank extending from the pivot and a blade mount extending from the pivot, the crank and the blade mount having cavities connecting with a cavity in the pivot, and the cavities providing a washer fluid path through the arm.

These and other objects and advantages will be more apparent from the following description and drawings.

DESCRIPTION OF THE PREFERRED EMBODIMENT

Figure 1:
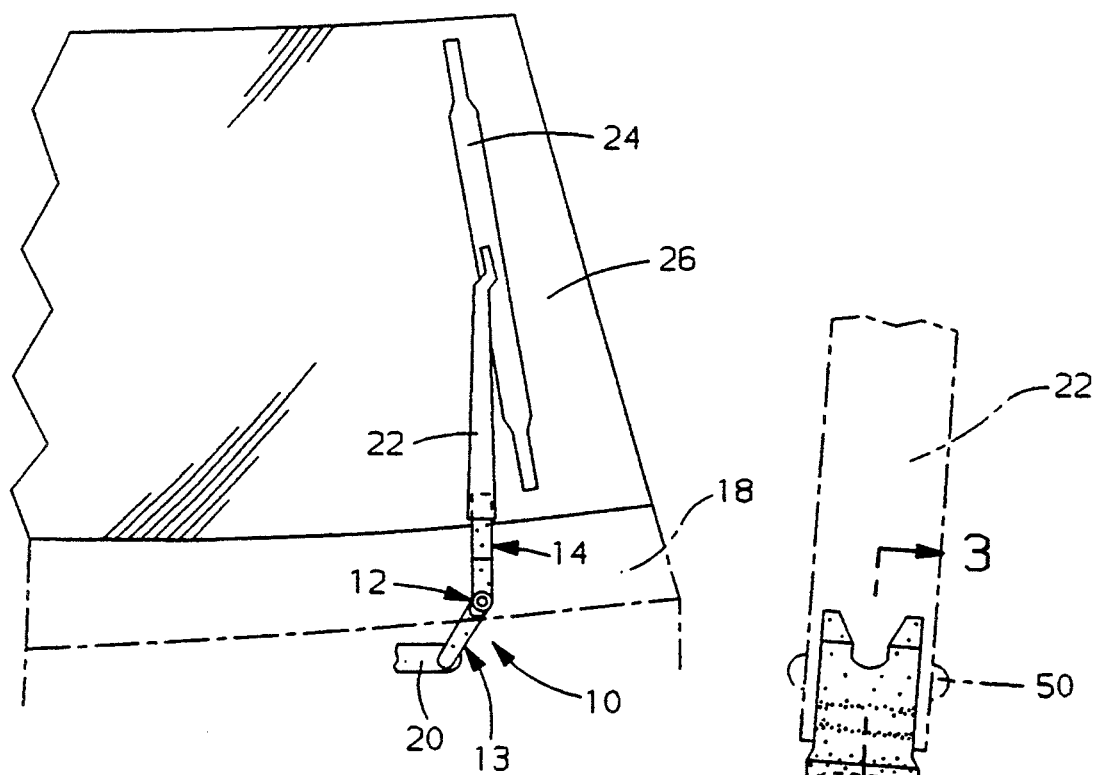
FIG. 1 shows a top view of a windshield wiper arm as it is installed in a vehicle.
Figure 2:
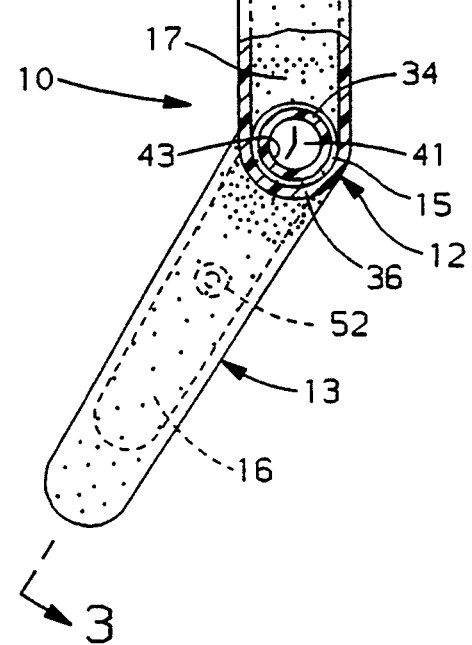
FIG. 2 shows a top view of a windshield wiper arm with a partial section of the blade mount and the pivot.

An integral wiper arm 10 is shown as it would be positioned in a vehicle in FIG. 1 with the arm 10 near the end of its stroke. The arm 10 has a bellcrank configuration with three principal portions: a pivot 12, a crank 13 and a blade mount 14. The crank 13 and the blade mount 14 both extend out from the pivot 12. The wiper arm 10 is essentially hollow, having three interconnected cavities: an annular cavity 15 in the pivot 12, an interior cavity 16 in the crank 13, and an interior cavity 17 in the blade mount 14.

Figure 3:
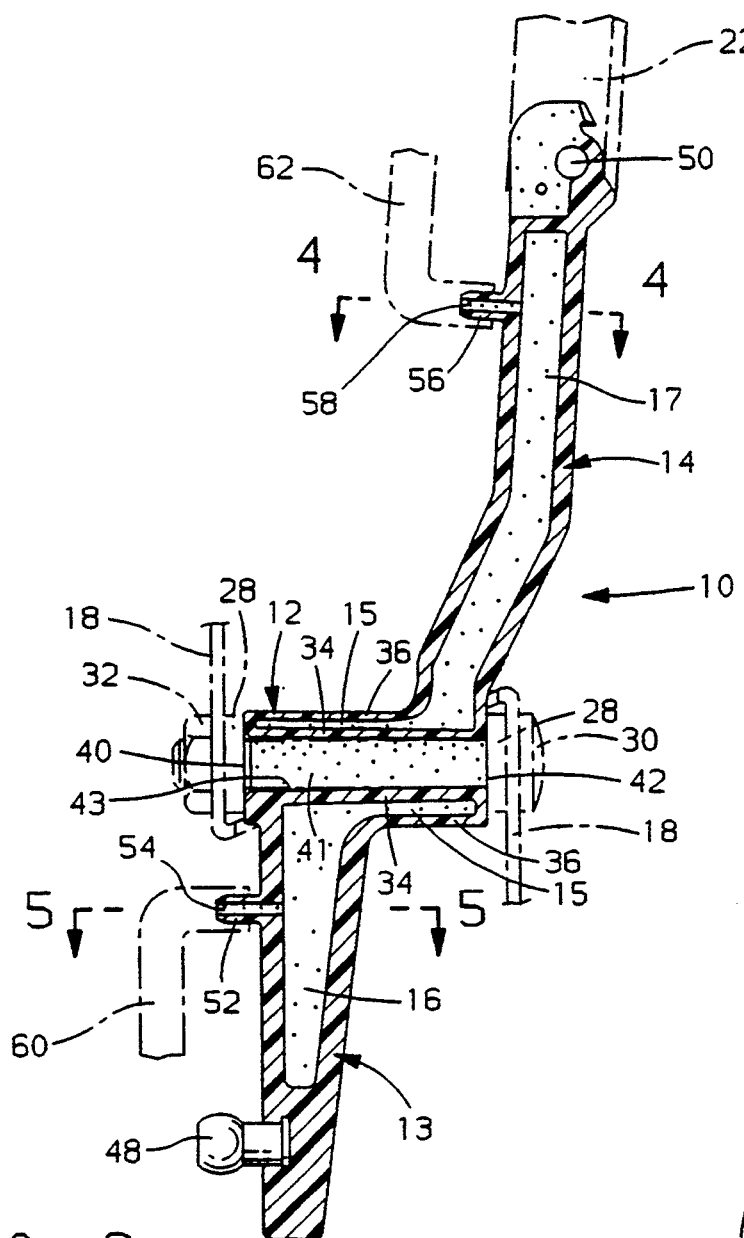
FIG. 3 shows a sectional view of a windshield wiper arm taken in the direction of Arrows 3 of FIG. 2.

The wiper arm 10 is rotatably mounted to a dual flange cowl or dual sheet cowl 18 through the pivot 12. A link 20 extending from a drive mechanism (not shown) is swivelably connected to the crank 13. An arm extension 22 and blade 24 are attached to the blade mount 14. The blade 24 is disposed on a windshield 26. The means of rotatably mounting the wiper arm 10 to the cowl 18 is best seen in FIG. 3. The arm 10 is inserted into the cowl 18 with thrust washers 28 placed between the arm 10 and the cowl 18, and a bolt 30 passed through the cowl 18, the thrust washers 28, and the pivot 12 of the wiper arm 10. The bolt 30 is retained by a torque prevailing nut 32 on a bottom side of the cowl 18.

The pivot 12 has a double walled cylindrical sleeve configuration. An inner wall 34 and an outer wall 36 have the annular cavity 15 disposed between them. The inner wall 34 and the outer wall 36 are joined at a first and second end 40 and 42, respectively, of the pivot 12 to seal the cavity 15. The inner wall 34 defines an aperture 41 through the pivot 12 accommodating the passage of the bolt 30 through the pivot 12. The inner wall also provides a bearing surface 43 accommodating the rotation of the arm 10 about the bolt 30. It should be noted that when the pivot is configured to be relatively short, the crank and blade mount resultantly move closer together, making the pivot's outer wall 36 increasingly less distinguishable from the crank 13 and the blade mount 14, and the annular cavity 15 less annular.

Figure 5:
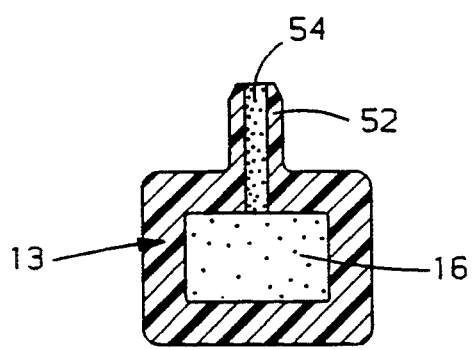
FIG. 5 shows a sectional view of a crank of the windshield wiper arm in the direction of Arrows 5 of FIG. 3.

The crank 13 extends from the pivot 12 at the first end 40. The crank 13 has a generally box shaped cross section, best seen in FIG. 5, which provides the interior cavity 16 of the crank. The interior cavity 16 of the crank 13 is fluidly connected to the annular cavity 15 of the pivot 12. The crank 13 has a steel ball stud 48 molded into an end opposite the pivot 12. The ball stud 48 serves as a means of swivelable attachment to the link 20 of the drive mechanism.

Figure 4:
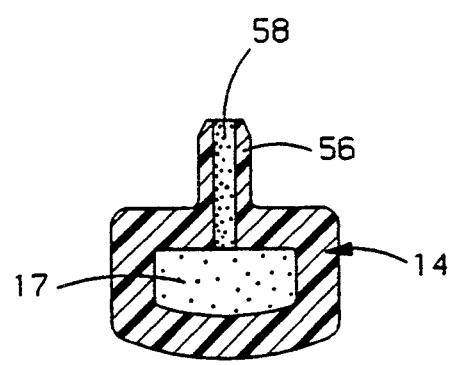
FIG. 4 shows a sectional view of the windshield wiper arm blade mount in the direction of Arrows 4 of FIG. 3.

The blade mount 14 extends from the pivot 12 at the second end 42 and is offset from the crank 13. The blade mount 14 also has a generally box shaped cross section, best seen in FIG. 4, which provides the interior cavity 17 of the blade mount. The interior cavity 17 of the blade mount 14 is also fluidly connected to the annular cavity 15 of the pivot 12. The blade mount 14 accommodates a hinged connection 50 to the arm extension 22.

A first nozzle 52 projects from the crank 13 and has a first opening 54 which fluidly connects the interconnected cavities 15, 16, 17 of the arm 10, with the surrounding ambient environment. A second nozzle 56 projects from the blade mount 14 and has a second opening 58 which also fluidly connects the interconnected cavities 15, 16, 17 of the arm 10 with the surrounding ambient environment.

The nozzles 52, 56 aid in the use of gas injection molding to form the arm. The second nozzle 56 serves as a gate which accommodates the flow of a thermoplastic and a pressurized gas into a mold (not shown). A shot of molten plastic is injected into the mold through the second nozzle. Gas is then injected into the mold through the second nozzle. This forces the plastic outward against the mold surface. The pressurized gas forms the interconnected cavities 15, 16, 17 within the arm 10 during molding. Any residual air within the mold trapped by the expanding plastic is exhausted through small openings in the mold. The molten plastic solidifies after contact with the cooler mold walls. Temperature control of the mold walls aids in the control of localized thickness of the molded part. The second nozzle 56 also serves as a vent, relieving the pressurized gas within the cavities 15, 16, 17 after the thermoplastic begins to harden.

Once the arm 10 is installed in a vehicle, a first hose 60, best seen in FIG. 3, is pushed over the first nozzle. The first hose 60 communicates fluid from a reservoir (not shown) to the crank 13. The reservoir is located below the cowl 18 and serves as a source of pressurized washer fluid. A second hose 62, connected to the second nozzle 56, communicates fluid from the blade mount of the arm 10 to the windshield 26. When a demand for fluid is made by the vehicle operator, fluid from the reservoir flows through the first hose 60, through the opening 54 in the first nozzle 52 into the cavity 16 of the crank 13, through the annular cavity 15 of the pivot 12 and into the cavity 17 of the blade mount 14. The fluid then exits the blade mount 14 through the opening 58 in the second nozzle 56, passing through the second hose 62, to and through fluid outlets (not shown) and onto the windshield 26. There is no need for any type of rotating seal at the arm 10 since the fluid is completely contained within the arm 10 as the fluid travels through the arm 10 from below the cowl 18 to above the cowl 18.

Another benefit of the wiper arm 10 being hollow is an increase in the strength to weight ratio of the arm 10. The principal loading mode of the wiper arm 10 is bending. Bending strength, or the resistance to bending, of a structure is greater when most of the material is at a maximum distance from the center of bending, as is the case with hollow structures.

There are two bending modes of the arm which are benefited by this increase in bending strength.

The first bending mode of the arm 10 benefited is the result of the windshield wiper arm 10 being stroked back and forth. The drive mechanism link 20 displaces the ball stud 48 on the end of the crank 13. The arm 10 pivots about the bolt 30 in the pivot 12. The blade mount 14 moves through a corresponding arc. The blade 24 drags across the windshield 26, providing a resisting load.

The second bending mode benefited is the result of a spring load which keeps the wiper blade 24 pressed against the windshield 26. The spring load here is produced by a tensile spring (not shown) connected on a first end to the blade mount 14 of the arm 10 and on a second end to the arm extension 22. The tension in the spring tends to rotate the arm extension 22 and the blade 24 toward the windshield 26. The pivot 12 sustains much of the reaction load, resulting in a bending load being induced in the blade mount 14.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An integral wiper arm for a vehicle having both a source of pressurized washer fluid and a cowl that supports the arm, the arm comprising:
- a pivot having an inner wall, an outer wall and a cavity disposed between the inner wall and the outer wall, the inner wall defining an aperture passing through the pivot;
- a crack extending a first length from the pivot having a generally box shaped cross section transverse to the first length of the crank providing an interior cavity, the interior cavity of the crank being fluidly connected to the cavity of the pivot; and
- a blade mount extending a second length from the pivot having a generally box shaped cross section transverse to the second length of the blade mount providing an interior cavity, the interior cavity of the blade mount being fluidly connected to the cavity of the pivot, whereby the interconnected cavities provide a path for the pressurized washer fluid through the arm.

2. An integral wiper arm for a vehicle as claimed in claim 1, further comprising:
- a first nozzle projecting from the crank, having a first opening fluid connecting the interconnected cavity with a surrounding ambient environment; and
- a second nozzle projecting from the blade mount, having a second opening fluidly connecting the interconnected cavities with a surrounding ambient environment.

* * * * *